Sept. 23, 1947.                D. GREGG                    2,427,778
                        ICE DETECTING MECHANISM
                         Filed Oct. 30, 1942
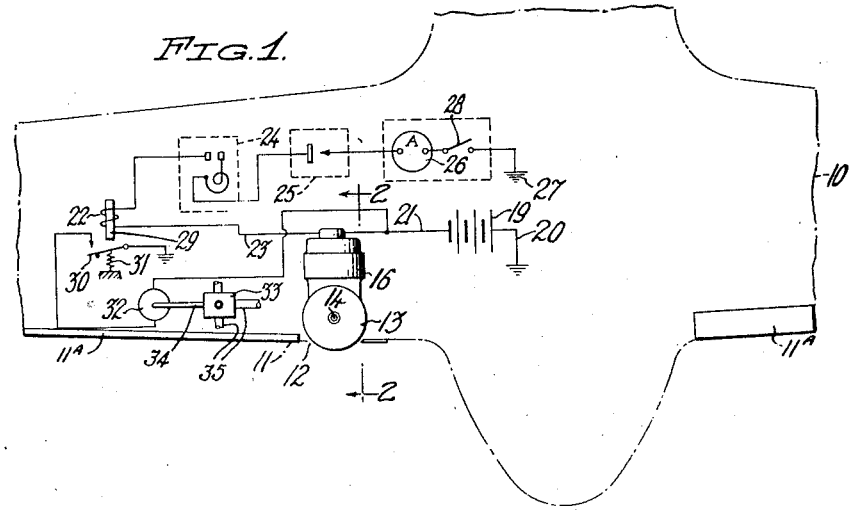
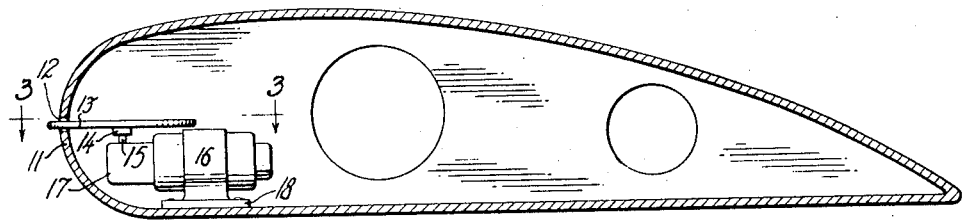
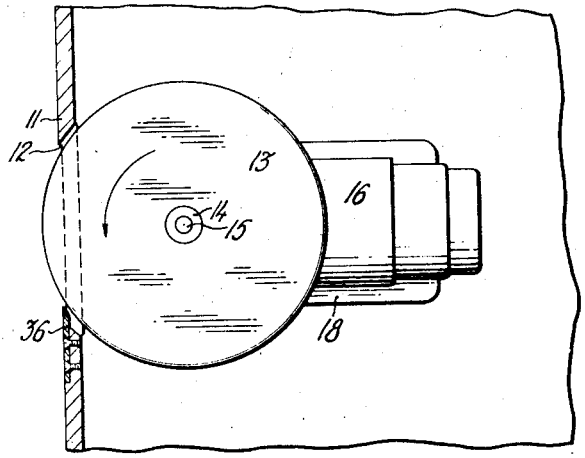
INVENTOR.
DAVID GREGG.
BY
ATTORNEY.

Patented Sept. 23, 1947

2,427,778

UNITED STATES PATENT OFFICE 2,427,778

ICE DETECTING MECHANISM

David Gregg, Caldwell, N. J., assignor to Bendix Aviation Corporation, South Bend, Ind., a corporation of Delaware Application October 30, 1942, Serial No. 463,975

9 Claims. (Cl. 244—134)

1

This invention relates to ice detecting systems, and particularly to a mechanism for the detection and automatic removal of ice from aircraft.

Rubber boot or pulsating tube systems are well known in the art, as represented by the Gregg Patent 1,990,866. Rubber boot installations such as that shown in the Gregg patent are effective in the removal of ice from the leading edges of aircraft surfaces, but the pilot utilizes his own discretion as to when the system is to be energized for the removal of ice. It has been found that too often the pilot delays in putting the mechanism into operation until the encrusted ice has formed a layer too thick to be effectively removed by the pulsating boots.

It is an object of the present invention to provide a mechanism to be carried by aircraft for indicating the formation of ice thereon.

A further object of the invention is the provision of a mechanism for detecting the presence and formation of ice on aircraft and for automatically causing the conventional distributor valve to be put into operation for the removal of ice.

Other objects include the provision of means subject to the accumulation of ice for automatically placing in operation a distributor valve, and also, the provision of means responsive to critical temperature and humidity values to place the automatic ice detecting unit in operation.

Other objects will appear from a study of the following specification when made in conjunction with the attached drawings, throughout which like numerals designate like parts.

Fig. 1 is a schematic diagram of one embodiment of the invention showing an airplane in dotted outline.

Fig. 2 is an elevational view, partly in section, taken along the line 2—2 of Fig. 1; and Fig. 3 is a plan view of the novel mechanism of the present invention taken along line 3—3 of Fig. 2.

The present invention includes an electrical circuit for detecting the presence of critical ice formations by the change in load current between the conditions of no ice and accumulated ice, for indicating this presence to the pilot and also for automatically putting into operation a conventional distributing valve for accomplishing the removal of ice from the wings and other leading edges equipped with conventional rubber boots.

In the drawings, 10 represents a partial outline of an airplane having a wing leading edge 11 provided with conventional rubber boots 11A

2 for the removal of ice and a slotted aperture 12 through which projects a small segment of a circular disc 13. Disc 13 has a central hub portion 14, which is fastened to a shaft 15 driven by an electrical motor 16 through a gear reduction unit 17. Motor 16 is mounted within the leading edge 11 of the airplane wing and is fastened thereto by rivets or bolts at 18. Motor 16 is supplied with electrical energy from battery 19, which has one terminal grounded at 20 and its other terminal connected to the motor 16 through a conductor 21. Motor 16 is connected in a series circuit with a relay winding 22 by means of conductor 23, a thermostat 24, a humidostat 25 and an ammeter 26 grounded at 27. Ammeter 26 may be mounted in the pilot's compartment and the series circuit including the ammeter may be made or broken through a pilot's control switch 28, or the contacts of the humidostat 25 or thermostat 24.

Relay winding 22 has an iron core 29 and includes a contact 30 which is biased to open position as shown by the spring 31. It will be noted that contact 30 is in a circuit parallel to the circuit of motor 16, and controls the operation of an electric motor 32 which drives a conventional distributor valve 33 through a shaft 34. Distributing valve 33 may be of the type shown and described in the above-identified Gregg patent, and pipes 35 may connect with the conventional rubber boots shown in the Gregg patent.

Attached to leading edge 11 by screws or other conventional means is a knife-edged cutter or scraper 36. The scraper 36 is spaced from the periphery of disc 13 by a fraction of an inch, and the scraper may be mounted adjustably on the wing so that the distance between it and the periphery of disc 13 may be set for optimum results.

At the beginning of a flight, the pilot may close switch 28, and since ice can be formed only at certain temperatures and at certain relative humidities, the humidostat may be regulated to close its contacts when relative humidities greater than 90 degrees are encountered, and thermostat 24 may be arranged to close its contacts when the atmospheric temperature is less than 34 degrees F. Until the contacts of both the humidostat 25 and the thermostat 24 are closed, the circuit of motor 16 is open, but upon encountering atmospheric conditions in which ice is liable to form, the contacts of the thermostat and the humidostat will be closed, causing motor 16 to rotate, driving disc or rotatable member 13 at a slow speed of about one revolution every five minutes through the gear reduction unit 17.

As disc 13 slowly rotates, ice forming on the aircraft's leading edges will form also on the edge and surface of the disc, and when the ice has accumulated to sufficient thickness, it will be scraped off by the knife-edge of cutter 36. Motor 16 will draw small, no-load or only light load currents when disc 13 is free of ice or when the ice thickness is less than the distance between the edge of disc 13 and scraper 36. When the thickness becomes greater, the work required to scrape ice from the edge of disc 13 demands an increased rate of current flow through motor 16 and ammeter 26. The rate of spring 31 is such that it cannot maintain contact 30 open against the pull of core 29 when this increased current flows, hence contact 30 closes, and motor 32 rotates to distribute air to the conventional rubber boots through distributing valve 33.

As ice continues to form, then scraper 36 continues to remove ice, and the ammeter continues to indicate the increased current consumption. The ammeter may be made to read "danger" or a like caution for high or greater than normal current drains so that the pilot may be advised of the fact that the deicers are going into operation. When ice ceases to accumulate on disc 13, scraper 36 ceases to remove ice and the current through motor 16, ammeter 26 and winding 22 will drop, causing contact 30 to be drawn open and ammeter 16 to register low or "safe" currents. When the atmospheric humidity drops below 90 percent, or the temperature rises above 34 degrees F., the circuit of motor 16 opens, motor 16 stops, and ammeter registers zero or "no ice."

It has been found that most effective deicing can be accomplished under certain conditions if the pulsating boots are not placed in operation until the ice on the leading edges has formed to a thickness approximating one-eighth of an inch. Knife edge 36 may be spaced from the periphery of disc 13 by one-eighth of an inch so that as disc 13 slowly rotates, the ice thereon may be accumulated to a skin one-eighth of an inch thick before knife edge 36 can scrape it from disc 13. The gap distance between disc 13 and cutter 36 may be varied, however, for different types of aircraft and for different atmospheric conditions.

While only one embodiment of the present invention has been shown in the drawing, it is to be understood that various changes may be made without departing from the scope of the present invention. For this reason, it is intended not to limit the invention by the description herein given as an example, but solely by the scope of the appended claims.

What is claimed is:

1. An ice formation indicator for aircraft, comprising a rotatable disc mounted within the leading edge of a wing, said wing having a slotted aperture through which a segment of said disc projects, a knife edge spaced from the periphery of said disc and lying generally in the plane of said disc at the leading edge of said wing, an electric motor driving said disc, an ammeter and a source of electrical energy in series circuit relation to said motor and separate humidity and temperature responsive means for closing said circuit when predetermined atmospheric humidity and temperature conditions capable of supporting ice formation are encountered in flight, so that, upon the building up of an ice layer in excess of a predetermined thickness upon said disc the ice is scraped therefrom by said knife edge, the load on the motor will be increased, resulting in an increased current drain readable from said ammeter, whereby said ammeter indicates such ice formation.

2. An ice accumulation indicator for aircraft comprising a rotatable disc mounted within the leading portion of a wing, said wing having a slotted aperture through which a segment of said disc projects into the atmosphere, an electrical motor driving said disc, a scraping member lying in the plane of said disc and radially spaced therefrom by a predetermined amount, a source of electrical energy and an ammeter in circuit with said motor, so that upon the accumulation of ice upon said disc to such thickness that the disc-borne ice is scraped therefrom by said scraping member, the load imposed upon said motor results in an increased current drain readable from said ammeter, whereby said ammeter indicates ice accumulation of a determined thickness.

3. In combination with a motor-driven distributing valve for controlling devices for the removal of ice, a marginal relay for controlling the operation of the motor driven distributor valve, a rotatable disc mounted within the leading edge of a wing, said wing having a slotted aperture through which a segment of said disc projects, a scraping member spaced from the periphery of said disc and lying generally in the plane of said disc at the leading edge of said wing, an electric motor driving said disc, a source of electrical energy in circuit with said motor and marginal delay, so that upon the accumulation of ice upon said disc in excess of a predetermined thickness the disc-borne ice is scraped therefrom by said scraping member, the load imposed upon said motor results in an increased current flow from said source and through said marginal relay, operating said relay to initiate operation of said motor-driven distributing valve.

4. In combination with a motor-driven distributor valve for controlling devices for the removal of ice, means for automatically initiating the operation of said valve comprising a rotatable member mounted within the entering edge of an aircraft surface, said surface having an aperture through which a portion of said member projects, a scraping member spaced from the periphery of said member by a determined amount, an electric motor driving said member, a source of electrical energy in circuit with said motor, so that upon the accumulation of ice upon said rotatable member to such thickness that the ice borne by said member is scraped therefrom by said scraping member, the load thereby imposed on said motor results in an increased current flow from said source, and means in circuit with said source and said motor and responsive to such increased current to initiate operation of said distributor valve upon an accumulation of ice of a predetermined thickness.

5. In an aircraft, the combination, comprising, a mechanism including inflatable members on the surface of said aircraft for preventing an accumulation of ice on said surface, a rotatable member carried by said aircraft, said rotatable member having a surface area exposed to ice formation, driving means for rotating said member, scraping means for removing from said rotatable member an ice accumulation on said surface area, whereby said driving means may be subjected by said scraping action to an increase in load, and control means responsive to such increase in load for initiating operation of said mechanism upon an accumulation of ice in excess of a predetermined thickness.

6. A device for detecting an ice formation in excess of a predetermined thickness, comprising, in combination, a movable member on which ice can form, motor means for driving said movable member, means for increasing the drag, and hence load, on said motor means in response to an accumulation of ice upon said movable member in excess of a predetermined thickness, and means responsive to said increase in load, whereby said ice accumulation may be determined.

7. A device for detecting an ice formation in excess of a predetermined thickness, comprising, in combination a movable member on which ice may accumulate, motor means for driving said movable member, an electrical circuit for energizing said motor means, braking means for increasing the drag, and hence load, on said motor means in response to an accumulation of ice upon said movable member in excess of a predetermined thickness, and electronic flow responsive indicator means connected in said circuit for indicating changes in said load, whereby a formation of ice in excess of said predetermined thickness may be indicated.

8. A device for detecting an ice accumulation in excess of a predetermined value, comprising, in combination, a member having a surface exposed to atmosphere and on which ice may accumulate, an ice cutter member for removing ice therefrom, motor means for continuously driving one of said members relative to the other, said ice cutter member increasing the load on said motor means upon an accumulation of ice on said surface in excess of the predetermined value, and means sensitive to said increase in load whereby said ice accumulation may be continuously determined.

9. In combination, a member on which ice may form, a member adapted to remove ice from said first mentioned member, a motor for driving one of said members relative to the other for causing the removal of said ice, the motor load being affected in accordance with the force required to remove the ice, and ice formation determining means responsive to the drag, and hence the load, on the motor caused by an ice formation of predetermined value on said first member.

DAVID GREGG.

REFERENCES CITED

The following references are of record in the file of this patent:

UNITED STATES PATENTS

| Number | Name | Date |
|---|---|---|
| 1,690,243 | Parrish | Nov. 6, 1928 |
| 2,171,450 | Langley | Aug. 29, 1939 |
| 2,182,547 | Tumey | Dec. 5, 1939 |
| 1,945,100 | Troll | Jan. 30, 1934 |
| 1,999,930 | Hirschl | Apr. 30, 1935 |
| 2,355,014 | Schorn | Aug. 1, 1944 |
| 2,182,530 | Baer | Dec. 5, 1939 |
| 2,159,186 | Tyler | May 23, 1939 |

---

Certificate of Correction

Patent No. 2,427,778.   September 23, 1947.

DAVID GREGG

It is hereby certified that error appears in the printed specification of the above numbered patent requiring correction as follows: Column 4, line 34, claim 3, for "delay" read *relay*; and that the said Letters Patent should be read with this correction therein that the same may conform to the record of the case in the Patent Office.

Signed and sealed this 16th day of December, A. D. 1947.

[SEAL]

THOMAS F. MURPHY,
*Assistant Commissioner of Patents.*